United States Patent
Levi et al.

(10) Patent No.: US 6,804,778 B1
(45) Date of Patent: Oct. 12, 2004

(54) DATA QUALITY ASSURANCE

(75) Inventors: Shaul Levi, Tel-Aviv (IL); Rafael Feitelberg, Tel-Aviv (IL); Assaf Topaz, Savion (IL)

(73) Assignee: Gilian Technologies, Ltd., Herzelia-Pituah (IL)

( * ) Notice: Subject to any disclaimer, the term of this patent is extended or adjusted under 35 U.S.C. 154(b) by 0 days.

(21) Appl. No.: 09/365,185

(22) Filed: Aug. 2, 1999

Related U.S. Application Data

(63) Continuation-in-part of application No. PCT/IL99/00203, filed on Apr. 15, 1999.
(60) Provisional application No. 60/129,483, filed on Apr. 15, 1999.

(51) Int. Cl.⁷ .............................................. H04L 9/00
(52) U.S. Cl. .................... 713/176; 709/203; 713/180; 713/193; 713/194; 713/200; 713/201
(58) Field of Search ............................... 713/193, 194, 713/291, 188, 189, 200, 201

(56) References Cited

U.S. PATENT DOCUMENTS

| | | | |
|---|---|---|---|
| 4,672,572 A | | 6/1987 | Alsberg ..................... 713/202 |
| 5,060,185 A | * | 10/1991 | Naito et al. ................. 707/202 |
| 5,161,192 A | | 11/1992 | Carter et al. ................ 713/162 |
| 5,343,471 A | | 8/1994 | Cassagnol ................... 370/401 |
| 5,406,628 A | * | 4/1995 | Beller et al. .................. 380/30 |
| 5,442,645 A | | 8/1995 | Ugon .......................... 714/736 |
| 5,454,000 A | | 9/1995 | Dorfman ...................... 714/54 |
| 5,475,839 A | * | 12/1995 | Watson et al. .............. 395/650 |
| 5,489,896 A | | 2/1996 | Sofer et al. .................. 370/445 |
| 5,548,649 A | | 8/1996 | Jacobson ..................... 713/153 |
| 5,550,957 A | * | 8/1996 | Davidson et al. ........... 395/114 |
| 5,576,755 A | * | 11/1996 | Davis et al. ................... 348/13 |
| 5,613,012 A | * | 3/1997 | Hoffman et al. ............. 382/115 |
| 5,623,600 A | * | 4/1997 | Ji et al. .................. 395/187.01 |
| 5,671,282 A | | 9/1997 | Wolff et al. .................. 713/179 |
| 5,701,342 A | | 12/1997 | Anderson et al. ........... 713/176 |
| 5,802,320 A | * | 9/1998 | Baehr et al. ............ 395/200.79 |
| 5,818,654 A | * | 10/1998 | Reddy et al. .................. 360/53 |
| 5,835,726 A | * | 11/1998 | Shwed et al. ........... 395/200.59 |
| 5,883,954 A | * | 3/1999 | Ronning ......................... 500/4 |
| 5,926,549 A | * | 7/1999 | Pinkas .......................... 380/25 |
| 5,935,246 A | * | 8/1999 | Benson ........................ 713/200 |
| 5,956,481 A | * | 9/1999 | Walsh et al. ................. 395/186 |
| 6,041,316 A | * | 3/2000 | Allen ............................ 705/52 |
| 6,233,618 B1 | * | 5/2001 | Shannon ...................... 709/229 |
| 6,327,579 B1 | * | 12/2001 | Crawford ..................... 705/400 |

FOREIGN PATENT DOCUMENTS

| | | | |
|---|---|---|---|
| DE | 198 38 253 A1 | * 2/2000 | ........... H04L/12/22 |
| EP | 0 872 990 A1 | 10/1998 | |
| WO | WO 97/37467 | 10/1997 | |
| WO | WO 98/40992 | 9/1998 | |

OTHER PUBLICATIONS

Schneier, Bruce. Applied Cryptograph. 1996, Canada, Katherine Schowalter, Second Edition. p. 4, 5, 32, 33.*

(List continued on next page.)

*Primary Examiner*—Ayaz Sheikh
*Assistant Examiner*—Aravind Moorthy
(74) *Attorney, Agent, or Firm*—Fenster & Company

(57) ABSTRACT

A method of data transmission including receiving a request for data over an Internet, by a data provider; obtaining data, in response to the request, at the data provider; applying a quality assurance procedure to the obtained data, responsive to the request, at the provider and other than any virus scanning of said data; and transmitting the data over the Internet responsive to the assurance. Preferably, the quality assurance procedure includes assuring that the data is pre-approved for transmission. Preferably, the procedure includes verifying a digital signature of the data.

35 Claims, 4 Drawing Sheets

OTHER PUBLICATIONS

Microsoft Press Computer Dictionary. 1997, Microsoft Press, Third Edition. p. 103, 210, 239, 258, 262, 327, 436, 437.*

Anonymous. "Getting the Right Virus Scanner". Computimes Malaysia, Feb. 19, 1998. Financial Time Information Limited.*

Buckler, Grant. "Softcop Claims Better Way to Try Before You Buy". Newsbytes News Network, Dec. 4, 1995. Financial Times Information Limited.*

Brenner, Brad. "LAN Fever: How to Protect Your Business from Computer Viruses". Office Systems. Office Systems Magazine Corporation, Jan. 1992.*

Yakal, Kathy. "Sign on the Digital Line." PC Magazine. Aug. 29, 2000. p 32.*

"Assured Website" E–Lock Technologies. Publication date unknown. Retrieved from the Internet via www.elock.com on Feb. 29, 2000.*

"G–Server—How it works" Gilian Technologies. Publication date unknown. Retrieved from the Internet via www.gilian.com on Aug. 21, 2000.*

Gilian Technologies Announces Participation in F5 Networks Affinity Partner Program. Business Wire. p 330. Apr. 24, 2000.*

"Frequently Asked Questions about Authenticode." FAQ Sheet. Microsoft Corporation. Feb. 17, 1997. Retrieved from the Internet via http://msdn.microsoft.com/workshop/security/authcode/signfaq.asp.*

"Microsoft Authenticode Technology" Whitepaper. Microsoft Corporation. Oct. 1996. Retrieved from the Internet via http://msdn.microsoft.com/workshop/security/authcode/authwp.asp.*

Tanenbaum, Andrew S. Computer Networks. Third Edition. Prentice Hall. 1996. pp. 613–622.*

Saleh, K. and K. Al–Saqabi. "Error Detection and Diagnosis for Fault Tolerance in Distributed Systems." Information and Software Technology. No. 39, 1998. pp. 975–983.*

Microsoft Press Computer Dictionary, 1997, Microsoft Press, Third Edition, pp. 108, 327, 430.*

Novalennium; Automation Engines—Concept of Operation; publication date unknown—copy provided from Sep. 13. 1999; http;//www.novalennium.comm/SecurePage/SecurePageConceptOfOperation.htm.

E–Lock Technologies; Products Assured WebSite; publication date unknown—copy provided from Feb. 29, 2000; www.elock.com.

Creative Digital Technology; SecurePage; publication date unknow—provided copy available from Feb. 29, 2000; http;//www.creative.com.au/cdtprod/Securepage.htmd.

* cited by examiner

DATA QUALITY ASSURANCE

RELATED APPLICATIONS

This application is a 119(c) of U.S. provisional application No. 60/129,483, with like title and filed Apr. 15, 1999, the disclosure of which is incorporated herein by reference. This application is also a continuation-in-part of PCT application PCT/IL99/00203, with like title and filed on Apr. 15, 1999, the disclosure of which is incorporated herein by reference.

FIELD OF THE INVENTION

The present invention relates to the field of data communications and especially to verification of outgoing data.

BACKGROUND OF THE INVENTION

A WWW server is an excellent target for hackers and for other miscreants who desire to have their exploits publicized. The server usually has a captive audience that downloads information (usually WWW pages) from the server. By modifying the information sent out by the server, such a miscreant publishes his exploits. For the owner of the server, the damage is disproportionate—the credibility of the server is severely reduced. In addition, erroneously published information may directly harm the server's owner, for example, by misrepresenting prices of services. The server owner would like to be able to stand behind what is "published" at the WWW site.

There appear to be two approaches in the art to avoiding interference with WWW services. A digital signature approach puts the onus on the receiver of a document (data) to verify that the document is what it purports to be. If the document does not match its attached signature, the receiver can assume that the document is bogus or corrupted. This solution, however, requires that the receiver be able to validate the document using the signature, typically requiring a copy of a public encryption key used by the signing protocol.

A security approach attempts to nullify the possibility of an outside break-in into the WWW server, for example using a firewall, so that it can be assumed that any information provided by the server is not adulterated by an outside hacker. Unfortunately, constructing a completely secure system is difficult, if not impossible, and miscreants are unusually creative in their efforts to "hack" into supposedly secure systems. An even greater problem is internal security. A disgruntled employee can bypass many security features by working at his computer terminal, inside the server physical location or by using a password which is known to him.

In addition, some secure systems disseminate information to a requester only after the requester's identity has been verified (usually using a password) and his permission to access the information confirmed.

Some types of firewall block requests for transmission of certain named files.

U.S. Pat. 4,672,572, the disclosure of which is incorporated herein by reference, describes various protection schemes for computer networks. One of the described schemes is a command filter which can monitor data transfers which pass through it and detect, block or modify sensitive information being transferred or sensitive commands from being carried out.

Recently, mail servers have been patched with software code that prevents the transmission of messages which appear to contain certain viruses.

The tripwire software and various virus detection software maintain a list of signatures of files. If one of the files is corrupted and does not match its signature, a system operator may be altered. In a virus detection system such a determination of mismatch may be made when a file is loaded into a computer memory for execution. In some systems, files are checked against their signatures periodically.

SUMMARY OF THE INVENTION

An object of some preferred embodiments of the invention is to assure the quality of data being published at a WWW site. In a preferred embodiment of the invention, incorrect content is prevented from being disseminated, irrespective of the manner in which it was generated (e.g., mistake, disgruntled employee or hacker).

An aspect of some preferred embodiments of the invention relates to a method of verifying, by a data provider, that data which is provided meets certain quality assurance criteria. In a preferred embodiment of the invention, data is checked before it is transmitted from the data provider, to determine if it meets the certain criteria. In a preferred embodiment of the invention, data is stamped with a digital signature. Preferably, the signature is determined by the time at which it is created and/or the time at which it is checked. Alternatively or additionally, the signature is determined based on the document contents. Thereafter, when the data is to be sent out, an output monitor checks that the data matches its signature. In some cases, some types of data may be stamped with a signature indicating that no quality assurance checking is to be performed. Preferably, the data is transmitted by Internet, for example using an HTTP protocol, an ftp protocol or an e-mail protocol. As used herein, the terms "quality control" and "quality assurance" relate to how data is assembled, generated and/or approved for transmission, not to security considerations.

An aspect of some preferred embodiments of the invention relate to data redress by an output monitor. In a preferred embodiment of the invention, a copy of some or all the data which can be transmitted is stored at a secure location. When data is proscribed from being transmitted, for example for reason of it being tampered, the output monitor obtains a "clean" copy of the data from the secure location and transmits the clean data instead. In some cases, the clean data may be more limited than the original data, for example a message which indicates that data is not being transmitted. Alternatively, proscribed data is not transmitted, so that transmitted WWW pages contain blank areas. Alternatively, a standard message is transmitted, to fill in the blank areas. Alternatively or additionally, the transmitted WWW page is modified so that the page appears not to be missing data and/or so that the distortion of the page is minimized. Alternatively, the altered data is allowed to go out, with an additional message, for example, to warn the user of possible corruption. An example of such a message is a disclaimer of warranty for the content of the data. Another example of a message is a warning that the data may be incorrect.

An aspect of some preferred embodiments of the invention relates to extending the data verification to a user of the data, preferably without an intermediate. In a preferred embodiment of the invention, a user can request that certain display objects be provided as verified objects. Alternatively or additionally, a user viewing program (for instance a browser) can indicate to a user if a displayed object is verified, bogus or does not require a signature.

An aspect of some preferred embodiments of the invention relates to extending the data verification to the verification of requests by a user. In a preferred embodiment of the invention, when a user request is received, the request is stamped so that it cannot be modified inside the server without the modification being detected. Thus, when the response to the request is sent out, it is possible to verify that the response matches the query, i.e., is appropriate and not corrupted.

There is therefore provided in accordance with a preferred embodiment of the invention, a method of data transmission comprising:

receiving a request for data over an Internet, by a data provider;

obtaining data, in response to said request, at said data provider;

assuring a quality of said obtained data, responsive to said request, at said provider; and transmitting said data over said Internet responsive to said assurance. Preferably, assuring a quality comprises assuring that said data is pre-approved for transmission. Alternatively or additionally, assuring comprises verifying a digital signature of said data. Preferably, verifying comprises applying a public-key decryption to said digital signature. Alternatively or additionally, verifying comprises applying a secret-key decryption to said digital signature.

In a preferred embodiment of the invention, said assuring comprises comparing said data to said request. Alternatively or additionally, assuring comprises comparing said data to stored data. Alternatively or additionally, assuring comprises checking secure information associated with said data. Alternatively or additionally, assuring comprises checking a limited usage-code associated with said data. Preferably, said limited usage code comprises a time-limited code. Alternatively or additionally, said limited usage code comprises a usage number-limited code.

In a preferred embodiment of the invention, assuring comprises checking a one-way hash function of said data. Preferably, said one-way hash function comprises a checksum function.

In a preferred embodiment of the invention, assuring comprises analyzing a content of said data. Alternatively or additionally, transmitting said data comprises not transmitting said data if said quality is not assured. Alternatively or additionally, said transmitting said data comprises transmitting said data if said data does not require quality assurance. Alternatively or additionally, the method comprises redressing said data if said quality assurance fails. Preferably, redressing comprises replacing said data with verified data. Preferably, said verified data is a copy of the data which was to be obtained by said data provider. Alternatively said verified data is a not up-to-date copy of the data which was to be obtained by said data provider.

In a preferred embodiment of the invention, said data is part of a data transmission set and wherein redressing comprises modifying said data transmission set.

In a preferred embodiment of the invention, said data provider comprises an Internet server. Preferably, said data provider comprises a WWW server. Alternatively or additionally, said data provider comprises an FTP server. Alternatively or additionally, said data provider comprises a mail server.

There is also provided in accordance with a preferred embodiment of the invention, a method of data manufacture quality verification, comprising:

receiving a request for data;

performing a first data manufacturing step to generate first stage data;

signing said first stage data;

performing a second data manufacturing step on said first stage data to generate second stage data;

signing said second stage data; and verifying said first and said second signatures. Preferably, said first signing comprises digital signing said first stage data. Alternatively or additionally, said verifying comprises verifying said first stage data prior to said performing a second data manufacturing step. Alternatively or additionally, said verifying comprises verifying both said first and said second signatures after performing said second data manufacturing step. Alternatively or additionally, said verifying comprises verifying as a part of a quality check prior to transmission of said manufactured data. Alternatively or additionally, said verifying comprises comparing said manufactured data to a data request for which said data is manufactured. Preferably, said data request is signed at receipt.

In a preferred embodiment of the invention, verifying said first stage data comprises verifying a signature on a program used for said first manufacturing step. Alternatively or additionally, said first stage signing is performed by a program which performs said first manufacturing step. Alternatively or additionally, said first manufacturing step comprises database querying. Alternatively or additionally, said first manufacturing step comprises retrieving data from a remote source. Alternatively or additionally, said first and said second manufacturing steps are performed at a computing site. Alternatively or additionally, the method comprises redressing said data if said verification fails. Preferably, said redressing comprises performing a backup data manufacturing process.

There is also provided in accordance with a preferred embodiment of the invention, a method of data corruption recovery, comprising:

detecting that data to be transmitted is corrupted, after said data is prepared for transmission and while transmitting said data;

redressing said data; and transmitting said redressed data instead of said corrupted data. Preferably, said redressing comprises retrieving replacement data from a secured location. Preferably, said secured location contains a copy of said corrupted data. Alternatively or additionally, said secured location contains a previous version of said corrupted data. Alternatively or additionally, said secured location contains a less up-to-date copy of said corrupted data.

In a preferred embodiment of the invention, said redressing comprises retrieving replacement data from a remote location. Alternatively or additionally, said redressing comprises modifying a data transmission to not include a reference to said corrupted data. Alternatively or additionally, said redressing comprises manufacturing replacement data for said corrupted data. Alternatively or additionally, said redressing is transparent to a receiver of said data transmission.

In a preferred embodiment of the invention, said secured location contains a warning message used for redressing said data. Alternatively or additionally, said redressing comprises adding a warning message to said data transmission.

In a preferred embodiment of the invention, said data redressing is transparent to a unit which prepares said data.

Alternatively or additionally, said data redressing is transparent to said transmitting. Alternatively or additionally, said data redressing is transparent to a reception of said data. Alternatively or additionally, said corruption of data is detected by checking a digital signature of said data. Alternatively or additionally, said corruption of data is detected after the data is prepared by an application layer of a communication system and before the data is transmitted via a physical layer of the communication system. Preferably, said corruption is detected by a separate hardware unit from a unit which prepares said data.

There is also provided in accordance with a preferred embodiment of the invention, apparatus for data transmission, comprising, a data provider which provides data to be transmitted;

an output monitor which monitors said provided data, wherein said output monitor verifies a quality of said provided data. Preferably, the apparatus comprises an Internet connection for transmitting said data from said output monitor over said Internet. Alternatively or additionally, the apparatus comprises a data signing unit which signs on generated data. Alternatively or additionally, the apparatus comprises a data backup store in which a backup copy of data is maintained. Alternatively or additionally, said output monitor signs on received requests for data. Alternatively or additionally, said data provider comprises an e-mail program. Alternatively or additionally, said output monitor is integrated with a WWW server. Alternatively or additionally, said output monitor is integrated with a firewall. Alternatively or additionally, said output monitor is integrated with a hardware networking component. Preferably, said networking component comprises a bridge. Alternatively or additionally, said networking component comprises a router. Alternatively or additionally, said networking component comprises a gateway.

There is also provided in accordance with a preferred embodiment of the invention, a method of data transmission comprising:

receiving a request for data over a communication network, by a data provider;

obtaining data, by computer, in response to said request, at said data provider;

assuring a quality of said obtained data, by computer, responsive to said request, at said provider; and transmitting said data over said communications network responsive to said assurance. Preferably, said communication network comprises a computer communication network. Preferably, said communication network comprises an Internet. Alternatively or additionally, said communication network comprises an Internet. Alternatively or additionally, said communication network comprises a local area network.

In a preferred embodiment of the invention, said communication network comprises a telephone network. Preferably, said telephone network comprises a cellular telephone network.

In a preferred embodiment of the invention, assuring a quality comprises verifying that said data matches a digital signature associated with said data.

BRIEF DESCRIPTION OF THE DRAWINGS

The present invention will be more clearly understood from the following detailed description of the preferred embodiments of the invention and from the attached drawings, in which.

DETAILED DESCRIPTION OF PREFERRED EMBODIMENTS

Figure 1:
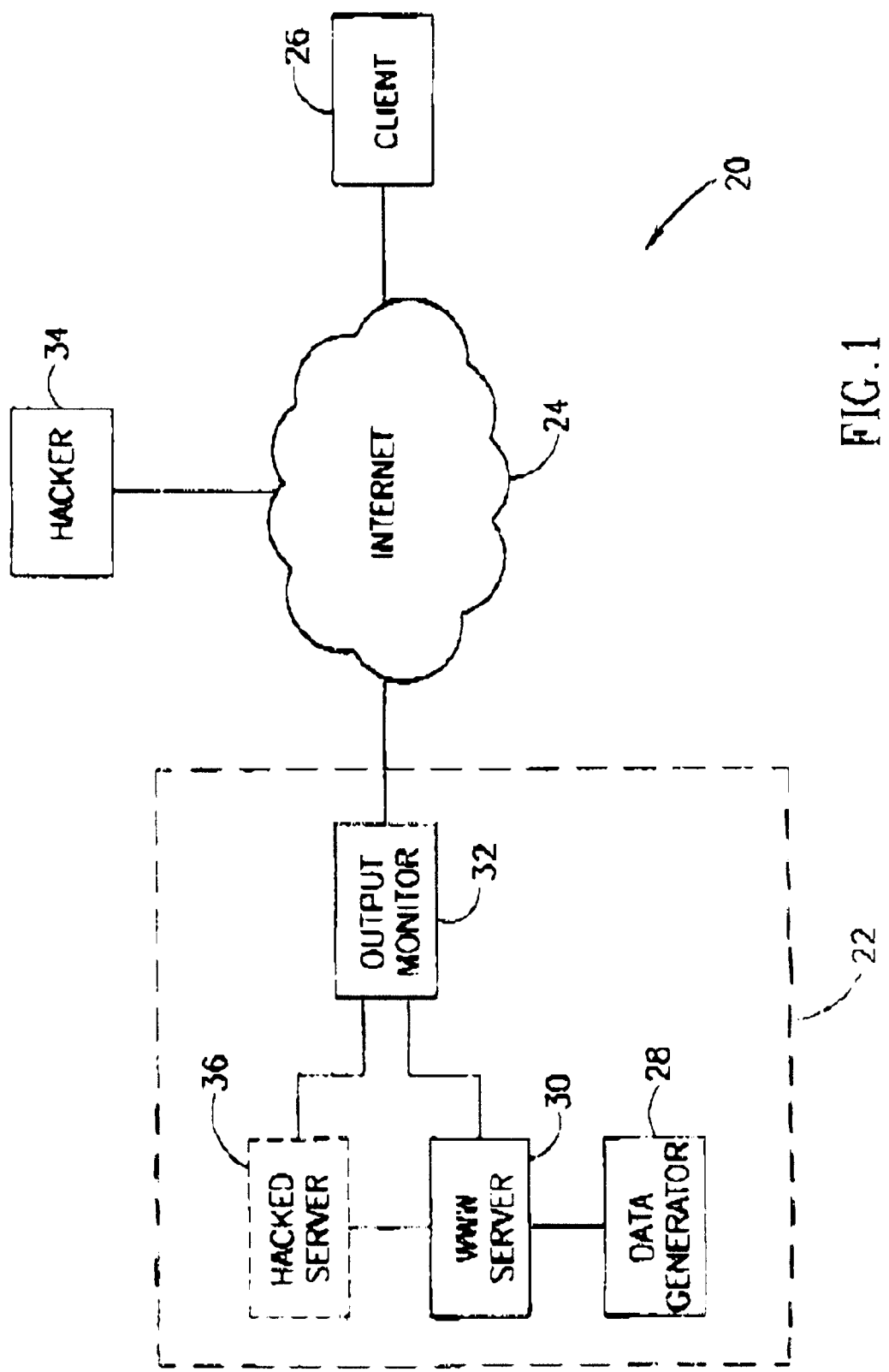
FIG. 1 is schematic block diagram of an Internet configuration including an output monitor, in accordance with a preferred embodiment of the invention.

FIG. 1 is schematic block diagram of an Internet configuration 20 including an output monitor 32, in accordance with a preferred embodiment of the invention. In configuration 20 a client 26 downloads information from a WWW site 22. Typically, a site 22 includes a data generator 28 which provides data to be downloaded and a WWW server 30, which responds to request from client 26 with data from data generator 28. Data generator 28 may dynamically generate data. Alternatively or additionally, generator 28 may retrieve data from a data store. An Internet 24 interconnects site 22 and client 26. In many real-world configurations, there is an additional, unwanted, partner, a hacker 34, which "hacks" into site 22 and modifies it. In some cases, hacker 34 modifies data generator 28. In other cases, hacker 34 installs a backed WWW server 36 which preempts at least some of the activities of WWW server 30. Other damaging activities are also possible. The end result of many of theses activities is that site 22 provides incorrect data to client 26. Although hacker 34 is shown connected to Internet 24, in some cases, hacker 34 may connect directly to site 22, for example by direct dial-up or by a local network.

In a preferred embodiment of the invention, an output monitor 32 is provided at the exit from site 22, to verify that only "correct" data is transmitted to clients. Thus, output monitor 32 can exert "exit control"0 on transmitted data. It should be noted that, by controlling the data at the exit, corrupted data can be stopped irrespective of the way in which it was corrupted. In a preferred embodiment of the invention, monitor 32 is located at the very exit from site 22, so that all communications must pass through it. Alternatively, monitor 32 is otherwise located so that not all the data from the site passes through it. In an exemplary embodiment of the invention, data is transmitted if the data is stamped with a digital signature that assures that outgoing data is approved for dissemination by a person having the authority for such approval. Often, data cannot be approved on a real-time basis. Therefore, in a preferred embodiment of the invention, data stored in data generator 28 is pre-approved by suitable personnel and digitally stamped/signed to secure the approval. When the data is to be transmitted, output monitor 32 checks to see that the data is signed and that the signature matches the data, before allowing the data to be transmitted. If hacker 34 modified the stored data or modified the server, it can be expected that data in a "server response" to a client request will not be properly signed and will thus be detected.

In a preferred embodiment of the invention, the exit control is applied after the data is already prepared for transmission and before it is physically transmitted to Internet 24. In the standard OSI/ISO seven-layer model of communication systems, this means that the exit control is applied after the data leaves the application layer and before it leaves the physical layer (of the last hardware element in site 22). In various preferred embodiments of the invention, the exit control may be embodied in any of the intermediate layers or even in the physical layer itself. The embodiment may take the form of a separate hardware/software unit or the exit control may be integrated with an exiting module, for example, with a TCP/LP stack.

Many types of signature methods are applicable in conjunction with preferred embodiments of the invention, including inter alia:

(a) Public-key signing methods. Data is signed with a private key and it may be checked by anybody having the public key. Thus, the private key may be maintained at a separate location from the output monitor, lowering the probability of hackers obtaining the signing key. Exemplary methods include, RSA, DSA and "elliptic curve".

(b) Secret-key signing methods. Data is signed with a same key as is used for checking, allowing a simplified system.

(c) Various one-way functions, for example check-sums, are used for checking data. This method may dispense with any cryptographic requirement.

(d) Comparison of the data with an exact, preferably secured, copy of the data. In a preferred embodiment of the invention, pattern matching and/or matching against a plurality of data items are provided, to increase the flexibility of the system.

In a preferred embodiment of the invention, the data itself is not modified by the signature, rather, a separate signature is provided. Thus, the data and the signature may be provided from separate sources. Possibly, the output monitor stores signatures for all the data which is allowed to go out. The data may be associated with an index to allow rapid determination of corresponding stored signatures. In one example, each datum comprises a unique ID. Alternatively, signatures are provided to the output monitor using a secure LAN or Internet connection. An unsecured connection may be used, if the signature is self protecting—i.e., cannot be modified without knowing the signature function.

Alternatively, the data itself may be modified by the signing process, for example by attaching signature data thereto or by encrypting the data using the signing key. Thus, the data may need to be decrypted, truncated and/or otherwise modified, before being used by client 26. If the data is encrypted, it may be decrypted before or after it passes through Internet 24, possibly requiring suitable software at client 26.

Alternatively or additionally, to data being stamped with a signature to indicate that the data itself was checked, data may include an indication that it was generated in an approved manner, as will be described below with reference to dynamically generated data. In one example, approved data may be associated with, stamped with and/or encrypted using a one time code, for example, one which is generated by a pseudo-random number generator. The validity of such a code can easily be checked by output monitor 32. However, the very act of using such a code out of turn will expose a non-authorized data transmission. Alternatively or additionally, since such codes cannot be reused or guessed at, they verify that a certain communication was authorized.

Alternatively or additionally, other types of data quality assurance may be applied, for example, analyzing sentence length, word length, spelling and/or vocabulary, to determine the quality of the data. Thus, the data may be checked against generalized rules which describe what is expected in data which is transmitted, rather than data being required to be an exact match to a signature.

Alternatively or additionally, outgoing data may be analyzed to determine if a proper security protocol is being used. In one example, some types of data need to be encrypted before being transmitted over the Internet. In another example, different data may require different keys, signers, signing methods and/or signing depth (e.g., number of bits in RSA method). In another example, data is allowed to be transmitted only to certain addresses. The "signature" or other secured information associated with the outgoing data can be used by the output monitor to verify that the data is being properly transmitted.

Alternatively or additionally to static tests, other tests may be performed on outgoing data. In one example, data transmission is limited by adjacency. If a first data element was sent, a second data element cannot be sent within a certain period of time, to a similar location, using a similar encryption and/or without special approval. Thus, even if a WWW site is compromised, transmitting sensitive data therefrom may be difficult. In another example, data may be date-stamped, so that it is allowed out only in a certain date window.

The outgoing data may be analyzed at various levels, for example as raw data, as HTTP code or as JAVA code which is encapsulated in HTTP code. Alternatively or additionally, it is possible to selectively analyze only some types of data, for example only data using an FTP protocol and not data using a POP3 protocol or differentiating between FTP static data and FTP dynamic data parts.

In a preferred embodiment of the invention, all data has some secure information associated with it, at least to enable a determination that no signature is required. Otherwise, a hacker might modify data and then mark it as not requiring a signature. Alternatively, especially if data requiring signing can be determined from its content, some data may not be signed or have associated secure information. In one example, all data which includes prices or images is signed, to avoid misrepresentation of prices or presentation of obscene images. Outgoing data can be analyzed to determine if it meets the requirements for being signed. In a preferred embodiment of the invention, output monitor 32 also stamps incoming requests. Thus, monitor 32 can compare the data response to the original request and determine its suitability, for example by the title of the returned data.

A particular type of user request is a query. In a preferred embodiment of the invention, the query is stamped on receipt, so that any tampering with it can be detected. In some (typically simple) query types, the query can be re-executed by the output monitor, to determine if the response matches the query. Alternatively or additionally, the output monitor can perform a query which responds with only the signatures of the returned data. Alternatively or additionally, a complete database from which data is retrieved, or portions of that database, may be digitally signed, so that the retrieved data can be verified as matching the original. Alternatively or additionally, an executable (or other program types, such as a script or DLL) which queries the database and/or which otherwise generates data can be signed, to verify that it has not been modified. Alternatively or additionally, such an executable is itself required to generate a signature, an encryption or a one-time code.

In a preferred embodiment of the invention, the request may include a definition of the data verification level required. Possibly, different verification levels may be allowed for static and for dynamic data.

The term "static" data is used for data which can be retrieved by copying a file. The term "dynamic data" includes both data which is dynamically retrieved from static databases and data which is dynamically generated or retrieved from remote location, for example real-time audio or stock quotes. Dynamic data can be viewed as data which is manufactured using a manufacturing process.

In a preferred embodiment of the invention, the manufacturing process includes data verification steps, to assure a continuity of correctness of the data. In one example, data is stamped with a digital signature by its originator (e.g., video camera, stock quote provider, data receiving module or database server). This signature is then verified before it is transmitted further on, possibly only by output monitor 32, but possibly also by other intermediate modules, such as the WWW server. Alternatively or additionally, the requests to these modules are also verified before being transmitted, for example, the WWW server checks the correctness of a query, before passing it on to the data generator. In a multi-step data manufacturing process, each step/module can sign the data, thereby indicating that that step was properly performed. Output monitor 32 can then determine whether or not data was generated according to its required specification. In one example, data may be required to be retrieved from a database "A" and then formatted by a typesetter "B". Such data is expected to have both "A" and "B" signatures on it when it reaches output monitor 32. Each of "A" and "B" can be considered to be manufacturing steps, in which data is generated, modified, or otherwise processed, in preparation for transmitting a response to a data request. In some cases, only a single data manufacturing step is required (e.g., database query), in others a plurality of such steps may be performed (e.g., a signal processing chain).

Alternatively or additionally, the executable which generates the data and/or a script, for example a CGI script used to respond to a user request, are preferably stamped/signed, so that it is possible to verify that only authorized scripts were used to generate data. Alternatively or additionally, an executable or a script may be checked in other ways, for example its execution time, by using test data or by checking the location of a program counter and verifying that the location matches (exactly or statistically) an expected profile.

A WWW page typically comprises many display objects, including pictures, active graphic elements and text. In a preferred embodiment of the invention, each one of these display objects can be separately signed and verified. In some cases, a single WWW page may include two types of data, some signed and some not.

In some cases verification of each and every transmitted data communication is impossible, for example for lack of sufficient processing resources, for instantaneous lack of processing resources or to avoid an undesirable delay. In a preferred embodiment of the invention, only some of the transmitted data communications are analyzed, for example on a statistical basis. For example, only some pages, some scts of pages, some display objects or data for certain locations, is checked. Alternatively or additionally, data communications are locally stored and analyzed off line. In a preferred embodiment of the invention, if an error is found, a message may be sent to those clients which might have received erroneous data. Alternatively or additionally, when a complete data message or file is sent in packets, all the packets are delayed from being sent out (preferably by storing in a local buffer), until all the data packets of a message (or file) are verified and/or redressed. Alternatively or additionally, a WWW site may self verify by transmitting a request to itself (either locally, or through the Internet) and then checking the response, preferably at the output monitor, to verify that a correct response was generated.

In a preferred embodiment of the invention, verification of outgoing data is used to maintain prestige of a WWW server. Alternatively or additionally, verification of outgoing data may be supplied to client 26 for a fee, or in return for his attention, for example to force viewing of advertisements. Possibly, the verification service is performed by a proxy or an intermediate verification server which checks the data for the client, before the data is transmitted on to the client. Possibly, an ISP can provide such a service by detecting that received documents do not match their signatures and then alert the client or stop the retransmission of the data.

Alternatively or additionally to quality assurance type checks, the outgoing data can be security checked to verify that it does not include viruses or other dangerous active material. Alternatively or additionally, the outgoing data can be checked for disallowed content, such as obscene language or disallowed language, such as "warranty" and "guaranteed".

In a preferred embodiment of the invention, outgoing e-mail is quality-checked, as described or checked using security checking, for example to determine the e-mail does not contain viruses. In a preferred embodiment of the invention, the checking is transparent to the user. Alternatively or additionally, the user is required to "sign" each piece of out-going e-mail. Possibly, each such signature comprises a limited usage code, such as a one-time code or a time-stamped time limited code, which is checked for correctness and/or sequence. Possibly, the one-time codes are provided using a magnetic card, a smart card or a diskette, so that they are more difficult to overcome by a virus. Possibly, the use of one-time codes does not include securing the data, so that it is not the content of the e-mail which is verified but only the fact that one e-mail is approved for sending.

Alternatively or additionally to allowing the transmission of data having a valid signature, data may be rejected for transmission, based on it having a particular signature. In one example, a list is maintained at the output monitor of data which is not allowed for transmission, for example by the data having a signature indicating that it is not approved yet. Alternatively, such a signature may be hidden as a tattle-tale marker in secret material. Possibly, such a signature comprises an arrangement of white spaces in a data file, so that it is not visible as a signature. Alternatively, the output monitor may comprise a list of checksums which are not allowed out. When portions of the data having the checksum are detected, those portions are stopped from being transmitted. Possibly, an entire file including those portions is stopped. Alternatively, one or more tattle-tales may be inserted in a file to prove its originality, instead of providing a separate signature. A file which does not contain required tattle-tales is stopped at the exits. This type of "signature" may provide only a lesser protection, since if such a file is modified, the tattle tales are not necessarily affected and in some embodiments, the tattle tales are not related to the contents of the file.

In a preferred embodiment of the invention, the verification of a signature is a one step process. However, in a preferred embodiment of the invention, a two- or higher-step process may be used. For example, a first step may detect data transmissions which are suspicious, for example by portions of them matching certain checksums, and a second step analyses those transmissions or the complete files in greater detail, for example using complete signatures. In one embodiment of the invention, an opposite scheme is used, in which data files, portions of data files and/or data transmissions are created and/or modified to have a same checksum (or other one-directional function), which is checked at the exit. If the desired checksum is not found, the file is stopped or analyzed in greater depth, or otherwise dealt with, as described herein. It is noted that for a particular data file and a data transmission system, it is possible to determine which portions of the file will be present in each data transmission of the file.

Figure 2A:
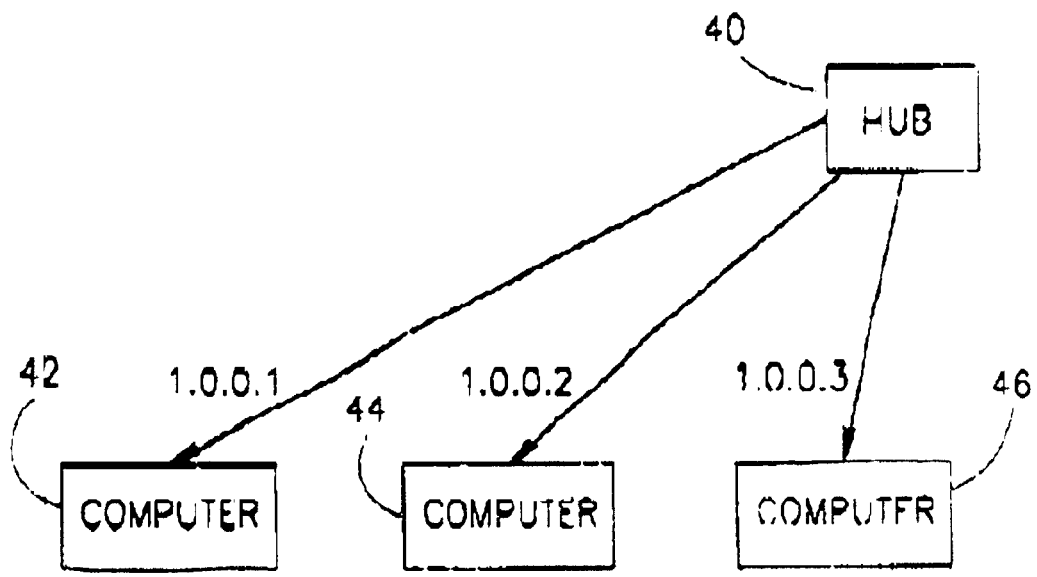
FIGS. 2A and 2B are schematic block diagrams illustrating a transparent installation of an output monitor, in accordance with a preferred embodiment of the invention.
Figure 2B:
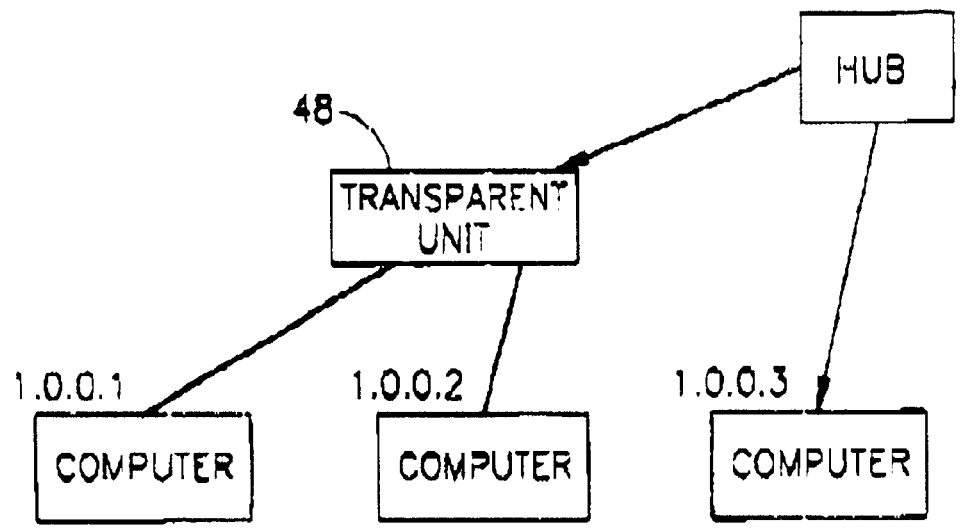

FIGS. 2A and 2B are schematic block diagrams illustrating a transparent installation of an output monitor, in accordance with a preformed embodiment of the invention. In FIG. 2A, a typical WWW server configuration is shown in which a plurality of computers (42, 44 and 46) are interconnected with a hub 40. In the example shown, computers 42 and 44 generate output to the Internet (e.g., corresponds to WWW server 30 in FIG. 1). Each of the individual computers has an IP address, for example 1.0.0.1, 1.0.0.2 and 1.0.0.3.

FIG. 2B illustrates the installation of a transparent unit 48, between computers 42 and 44 and hub 40. Unit 48 generates a second net work which includes only itself and computers 42 and 44. In a preferred embodiment of the invention, unit 48 does not have an IP address. Possibly, unit 48 does not even have a MAC address. Alternatively, if unit 48 only connects to a single computer, unit 48 can "steal" address of that computer. Preferably, unit 48 comprises two network adapters, one to connect to Hub 40 and one (or more) to connect to computers 42 and 44 (or a second hub). When computer 46 transmits a message to computer 42, this message passes through transparent unit 48. When computer 42 transmits a message, unit 48 checks that the message is allowed to be transmitted, before transmitting it on. Possibly, unit 48 only checks messages designated for the Internet.

As unit 48 has no address, it is difficult to hack into. Preferably, communication with the computer is possible by direct connection or by using its console. Alternatively or additionally, connections to a secret address are allowed. Alternatively or additionally, unit 48 monitors data transmission through it to determine if a certain transmission is actually intended for unit 48. Alternatively or additionally, a secure connection may be provided between unit 48 and one of the computers connected to it. In one example, the address of unit 48 changes continuously, so that it is more difficult (for a hacker) to track the address. In another example, data is transmitted at multiple addresses, so that a complete transmission includes data at multiple addresses.

In a preferred embodiment of the invention, when unit 48 is installed in an existing network, little or no network management activity is required by the network owner, since the connection is transparent.

Figure 3:
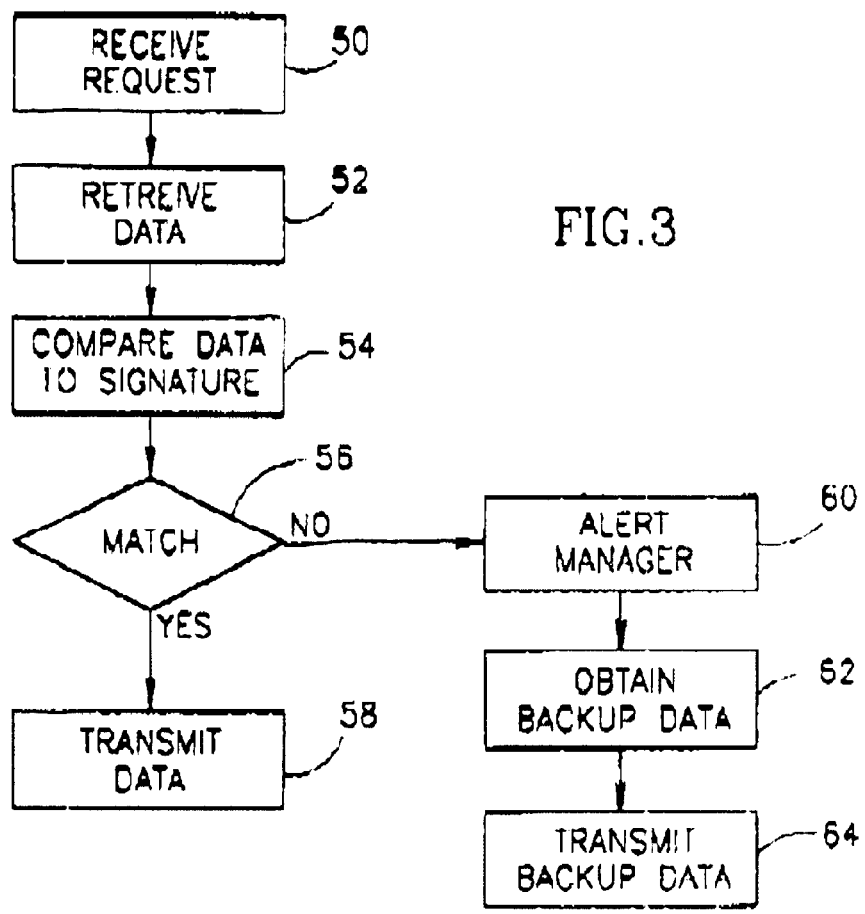
FIG. 3 is a flowchart of a process of data provision, including data redressing, in accordance with a preferred embodiment of the invention.

FIG. 3 is a flowchart of a process of data provision, including data redressing, in accordance with a preferred embodiment of the invention. First, a request for data is received from a client (50). Data is retrieved in response to the request (52). The data is compared to a signature (54, 56), preferably at the output monitor, to assure the quality of the data. If the data matches the signature (58) the data is transmitted.

If the data does not match the signature, this can be an indication of hacking into the server or improper data generation. In a preferred embodiment of the invention, a system manager of site 22 is alerted (60). Such an alert can be by email, by fax, by telephone or by any other means known in the art. Alternatively or additionally, the discrepancy is logged. Alternatively or additionally, security programs may be activated, for example, to detect modified data and program files or to check other security aspects of the site. In one example, if a signature does not match, all the files in the site are checked against a stored signature and/or the site computer is rebooted. Preferably, of course, the incorrect data is not transmitted. Alternatively or additionally, also incorrect data is transmitted, possibly with an attached warning. Alternatively or additionally, the incorrect data is rerouted to a different location, possibly a location where the data is viewed manually before being signed or a location where the data is submitted to more rigorous testing before it is allowed out of site 22. Alternatively or additionally, the disposition of the data is determined responsive to the data type and/or data content. Alternatively or additionally, the disposition of the data may be determined responsive to the client, for example, by part of the data request. Thus, some incorrect data is stopped and some incorrect data is transmitted on. It is noted that in a typical output monitoring system in accordance with a preferred embodiment of the invention, most of the data is allowed out of the system; however, corrupted data is never allowed out.

One consideration when stopping incorrect data is maintaining proper communications with the client. Often, only some of the data requested by the client is incorrect. In a preferred embodiment of the invention, the remaining data is transmitted on to the client, possibly generating an incomplete WWW page.

Alternatively or additionally, a message is transmitted to the client instead of, or in addition to, the data, indicating that some data was not transmitted due to its not meeting certain quality standards. In one example, a stopped image is replaced by an image marked "censored".

Alternatively or additionally, the transmitted data is modified to hide the fact that some data is missing. For example, if an image is stopped, any reference to the image may be deleted and/or the page may be reformatted. In another example, a stopped price quote is replaced by the phrase "please call us".

Alternatively or additionally, the incorrect data may be transmitted, together with a header or another messaging method, indicating that the data is incorrect.

Alternatively or additionally, the incorrect data may be replaced with backup data, possibly preserving the page format. Thus, in a preferred embodiment of the invention, backup data is obtained (62) and then transmitted to the client (64).

In a preferred embodiment of the invention, the backup data is a copy of the original data, maintained at a secure location which is accessible only, or mainly, by the output monitor. Thus, there is a greater probability that the backup data is not tainted. Possibly, the backup data is encrypted or stamped with a digital signature. Possibly, a copy of all the data is maintained. Alternatively, a copy of only some data is maintained. In one example, only data which is susceptible to corruption is maintained in copy. In another example, only data which must be available is maintained as a copy. Possibly, if data corruption is detected, a copy of the data is used to replace the site database, possibly automatically.

Alternatively or additionally, to a real copy of the data, the copy may comprise a warning message of some type. Alternatively or additionally, the copy may comprise lower quality information, for example a previous version, data with a lesser resolution (images) or data with a slower update rate or larger delay (stock quotes). Possibly, verified or secure static data is provided instead of corrupted dynamic data.

Alternatively or additionally, to replacing only the incorrect data with a copy, the entire page is replaced. Possibly, information about the client at the site is also modified, e.g., a user context record, so that future interaction will take into account the missing data.

If the data is dynamic data, which is generated by a process, detection of corrupted data or an incorrect process may prompt switching to a backup process. The backup process may utilize verified and/or secured copies of the executables used for the standard process. Alternatively, the backup process may use a different, but comparable method, be more robust, slower, more expensive, less flexible, have reduced features or be otherwise less preferred than the standard process. The backup process may then be used for further data requests.

Alternatively or additionally, if site 22 is determined to be corrupted, data is provided from a remote location. In one embodiment of the invention, the client request and the connection are routed to a remote site or the same or different service provider, while site 22 is checked out. In another embodiment the data request is forwarded to the remote site, where it is answered, verified, signed and transmitted back to site 22 to be forwarded to the client. It should be noted that such forwarding of requests and connections can also be useful if site 22 is momentarily lacking in processing power, i.e., for fault tolerance, load balancing and/or assuring response times.

Figure 4:
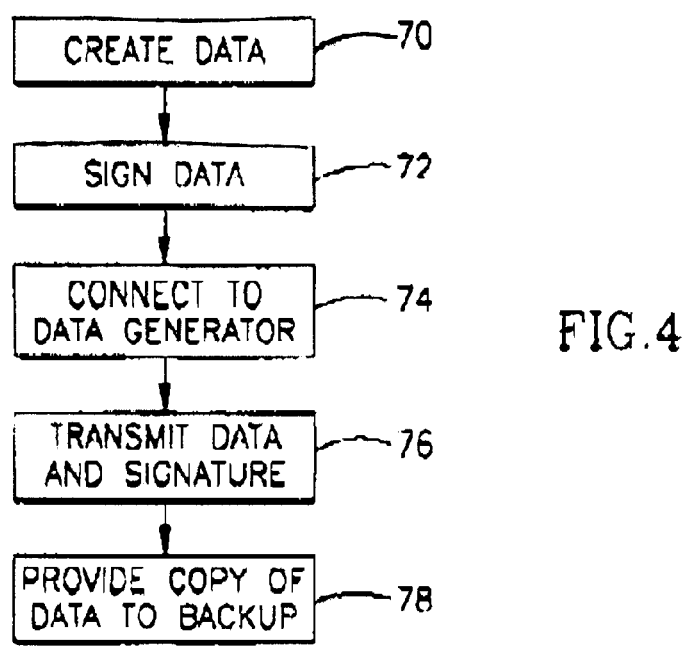
FIG. 4 is a flowchart of a method of data quality stamping, in accordance with a preferred embodiment of the invention.

FIG. 4 is a flowchart of a method of data quality stamping, in accordance with a preferred embodiment of the invention data is created (70), for example by graphic artists. Once the data is checked for quality and suitability, the data is signed (72). In some cases, data may require multiple signatures, for example of a worker and his supervisor or of the worker and the person whose data is being presented (e.g., sales). Alternatively or additionally, other secured information is associated with each data element, for example date stamps. Alternatively or additionally, different types and/or parts of the data may require signing by different authorizers. Possibly, a hierarchy of signing is required. In some cases, one or more of the authorizers may be automated programs, for instance a spell checker.

In a preferred embodiment of the invention, the data is created on a network which is separate from that of site 22. Thus, after the data is signed, the computer on which it is stored is momentarily connected to data generator 28 (74) and the data and/or the signatures are transmitted to generator 28 (76). Alternatively or additionally, the data and/or signatures are transmitted by removable media, such as tapes or diskettes. Possibly, the signatures are provided separately from the data and/or are provided to a remote site, for example by mail. Thereafter, a backup copy of the data may be provided to the output monitor (78), possibly by electronic connection or by physical transfer of storage media.

Alternatively, the data is created on a same network as site 22. In a preferred embodiment of the invention, data is signed using a hardware element, which cannot be broken into by a hacker, for example a magnetic card. In another example, the software and/or the encryption keys are stored on a write-protected diskette, which is placed in a drive only for the duration of the signing.

Referring back to FIG. 1, in some preferred embodiments of the invention, some verification activities are performed by suitable software at client 26, for example software integrated with a user's browser, a plug-in or a stand alone software unit. These verification activities may include those of a client agent, described below. In a preferred embodiment of the invention, when a verified page is displayed to a user, the display also indicates that the page was verified (during transmission). Alternatively or additionally, a user can request verification of certain display elements. Such a request may be forwarded to the same site or to a different site. Alternatively or additionally, the display to the user indicates if the data failed verification. Alternatively or additionally, the display to the user indicates various statistics, such as the number of non-verified or incorrect data elements received from a site. In some cases, the client computer will also perform verification of data that it receives, for example by checking its signature.

Alternatively or additionally, client 26 includes a software module which verifies data before it is sent out from the client to the server. Examples of such checking include spell checking, address checking (for correctness of spelling) and checking the correctness of data entered in forms filled out by the client, for example name and telephone numbers. This data may be detected by pattern matching, for detecting fields which may contain name or address information. Alternatively or additionally, when a client uploads data (or performs any type of data transmission), the client may be protected by an output monitor as described above, since by uploading data, the client acts as a "server" rather than as a client.

In a preferred embodiment of the invention, client 26 uses an automated agent which queries WWW servers. In a preferred embodiment of the invention, the automated agent performs quality testing on the data before passing it to the client. Alternatively or additionally, the automated agent tracks which sites provide a verification of transmitted data. This tracking can be used to detect sites which suddenly stop providing verified data or to provide a client with an estimation of the dependability of the data. Alternatively to automated agents, an identification of a site as one that does or can provide verified data is maintained in an Internet Index, such as "Yahoo".

Figure 5:
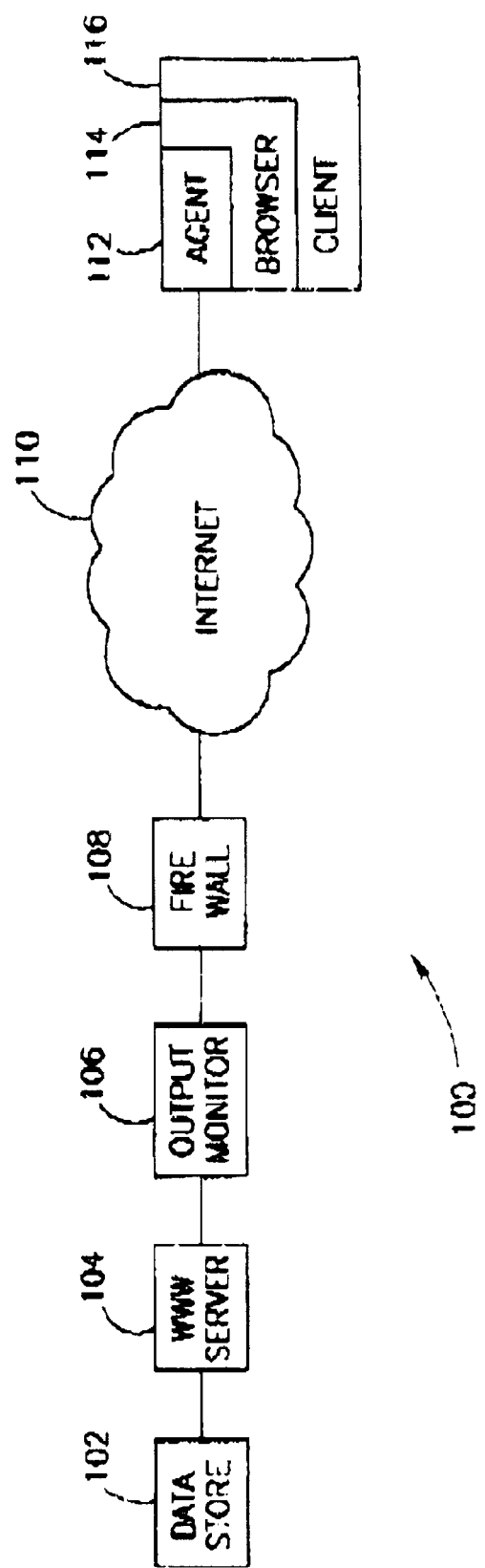
FIG. 5, is a schematic block diagram of a system configuration for a preferred embodiment of the invention.

FIG. 5, is a schematic block diagram of a system configuration 100 for a preferred embodiment of the invention. Data stored in a data store 102 is provided to a WWW server 104. An output monitor 106 verifies the data and then transmits it over an Internet 110 to a client 116. The WWW server is preferably protected by a firewall 108. Possibly, monitor 106 is at a different location in the sequence, for example, in front of the firewall, integrated with the firewall or integrated with server 104. Thus, in some configurations, not all the outgoing data passes through the output monitor. Alternatively, a single output monitor can monitor a plurality of WWW servers. In some configurations, a pool of output monitors monitor a pool of one or more WWW servers. In one example, one or more output monitors check transmissions from a plurality of WWW servers in a university or a large corporation. By using a single pool or even a single output monitor, standardization of quality assurance standards may be ensured. Preferably, the output monitors cross-check with each other to verify that none of them has been compromised or replaced by a hacker.

In a preferred embodiment of the invention, output monitor 106 comprises a standalone hardware unit or a card for a network unit. Alternatively, monitor 106 comprises a software unit. In a preferred embodiment of the invention, monitor 106 listens in on a standard port, such as port number 80. The WWW server sits on a different port, such as port number 81, and monitor 106 copies to and from port number 81.

Alternatively or additionally, monitor 106 may be integrated with hardware components, such as hubs, gateways, switches, routers and modems. Client 116 preferably comprises a client agent 112 which receives the communicated data and uses (or is integrated with) a browser 114 to display the data.

In a preferred embodiment of the invention, the process of verifying the data and/or redressing the data is transparent to the data generator and/or to hardware which actually transmits the data. In a preferred embodiment of the invention, the data generator and/or the transmission hardware does not need to be modified to work with the output monitor. Alternatively or additionally, the above processes are transparent to a receiver of the data, especially with regard to communication protocols. Preferably, as described above, the fact that data was redressed is also hidden from the user.

In a preferred embodiment of the invention, the WWW server and/or the output manager include a dispatcher which receives requests and generates a thread for handling the request. Preferably, the thread matches the protocol of the request. In a preferred embodiment of the invention, the WWW server can service multiple ports and/or IP addresses. Alternatively or additionally, the server can listen in on multiple addresses or ports, with a minimum of overhead.

In a preferred embodiment of the invention, the output monitor includes a key mapper which maps URL request to keys for data verification. In some cases, two URLs may map to a single key, for example, if two URLs point to a same file. In other cases, a single URL may map to multiple keys—a single main key and dependent keys. Transmitting the response to the URL preferably requires verifying all the keys. Alternatively, a subset of keys to be verified may be defined. Multiple keys are useful, for example, if the URL does not point to a real file (in which case the parent directory is preferably mapped to a key) or if a default file is requested (in which case the directory is provided). In this way, modification of some files requires modification of parent directories as well, which is usually more difficult to do. Alternatively or additionally, the key may include an indication as to whether the data is static or dynamic. Alternatively or additionally, a dependent key may be a key of an executable which is executed to answer the data request. In a preferred embodiment of the invention, a cache is maintained of keys and/or of key-mappings, so that they can be retrieved more efficiently. In many cases the key mappings are static; however, in other cases, the mappings are dynamic, i.e., the key-mapper determines which keys (identification and number) need to be verified for a particular URL. Dynamic mapping is particularly relevant for URLs which request an action of retrieving data from a database.

In a preferred embodiment of the invention, the communication between the output monitor and the WWW server and/or communications between processes inside the output monitor and/or the WWW server are secure or at least signed, so that if the communications are modified, such modification is detectable. In a preferred embodiment of the invention, the output monitor checks that all (or part of) the components of the server match their signatures and/or that all (or part of) the stored data files match their signatures. This checking may be performed when the monitor is started, preferably after the security of communication is verified. Alternatively or additionally, such checks (complete or statistical) may be performed periodically or in response to events which indicate the possibility of a break-in. In a preferred embodiment of the invention, a manual boot web server checking software is provided so that the integrity of the server, output monitor, communication libraries, operating system, memory contents and/or executable software can be checked during a manual (and stepped) booting of the server, especially to verify that there is no unexpected software present.

In a preferred embodiment of the invention, the output manager includes a console for setting up the output manager and for viewing recorded data. Preferably, the output manager also includes a data logger which records various information regarding data requests and responses, including data packet type, source and destination addresses, signatures (or lack thereof), URLs, times and whether the request succeeded. Alternatively or additionally, the console may be operative to display active processes and requests.

In a preferred embodiment of the invention, the verification of data utilizes a database in which the signatures are stored. Preferably, the database is a multi-thread data base (so several processes can read it at a time) and also may include a cache. In a preferred embodiment of the invention, the database grows by fixed amounts when required; but, if further growth is not possible (e.g., low disk space) operation continues without the additional signatures. Possibly, a commercially available database is used. In a preferred embodiment of the invention, a certification authentication database or a tripwire-like database, which is already designed to include key mappings and/or signatures, is used.

In a preferred embodiment of the invention, client agent 112 (at the user) can also perform certain verification activities. Preferably, when the client agent receives a possibly verified page or display object, the client agent can display whether or not the page is verified. Alternatively or additionally, the client agent can ask for a confirmation of the verification. Alternatively or additionally, the client agent can perform the verification itself. Possibly, the client agent can request the signature from the output monitor. Alternatively or additionally, the signature is sent with the display object. Thus, the client agent can determine that the display object was not corrupted at a proxy or at another location along the transmission route of the display object.

In a preferred embodiment of the invention, non-standard data types are used for verifiable data, for example "ggig" and "gjpeg". When such a file type is detected, the client agent knows to ask for verification data. Alernatively, standard data types may be used, especially if they are overloaded with new definitions. Alternatively, standard data types may be used, especially if they are overloaded with new definitions. Alternatively or additionally, the client agent analyzes the data to determine if it meets certain criteria, for example arriving from a domain which matches a locally stored list.

In a preferred embodiment of the invention, when a problematic object is received (not verifiable or having an incorrect signature) the client agent can selectively display or not display the object. Alternatively or additionally, a message may be displayed. In a preferred embodiment of the invention, a single window is used to summarize the verification status of all the display objects. In a preferred embodiment of the invention, the client agent tracks when display objects change from verified to non-verified. A variety of object types can be verified, including one or more of the following object types: HTML code, images, JavaScript, Java Applets and downloaded files. Preferably, a user can select for each file type and/or based on other classification schemes, whether to show the object, execute the object and/or what type of notification to generate In a preferred embodiment of the invention, another type of verification is provided, namely verification of correct usage of a logo, image or other trademark-like object. Often, a WWW page will include an indication that is was reviewed by a certain reviewer, that it is an authorized provider of a certain manufacture or that the information it contains is verifiable by a certain information provider. In a preferred embodiment of the invention, such a WWW page will include an image of a logo associate with the third party whose reputation is being alluded to. The proper usage of that logo will be verified by the client agent, without the requirement that the third party to be on-line. In a preferred embodiment of the invention, when such a logo is detected, the client agent requests from the server a license for using that logo. In one example, such a license includes a domain (or more complete URL), a signature, an expiration date and a license code. By checking the signature the client agent can determine if the license is valid and/or is being used in a valid manner. Alternatively to requesting the license from the WWW server, the license may be provided with the object. Other license formats may also be used. In a preferred embodiment of the invention, the object to be licensed is indicated by being of a particular type, for example "gipeg" or "ggif".

In a preferred embodiment of the invention, the client agent also maintains or can retrive a list of sites which provide verification services.

The above embodiments have been described especially with reference to Internet applications. As used herein, the term "Internet" is directed towards "the" Internet, which is a very large and open network of computers interconnected using a set of protocols. Thus, the term "Internel" is meant to include evaluations of the Internet, such as "Internet II" and other evaluations. Special issues in Internet applications include the lack of identification and long-term relationship with the clients, lack of verification means, the probability of many backers attacking the site, and the irrevocable damage to the prestige of the site if incorrect data is "officially" disseminated. However, the above methods may also be applied to other communication networks. In one example, other types of computer networks are used, for example, Intranets, LANs and WANs. Alternatively, the methods are applied to non-computer networks. For example, a wired or a celluar telephone network may include an output monitor as described above. For example, when an incoming voice message is received, it is stamped, for example with a digital signature and/or with a time stamp. When the message is retrieved by a user, the message is only allowed out if it matches the signature. It should be noted that both text and voice data can be stamped with a digital signature.

It will be appreciated that the above described methods of data quality assurance may be varied in many ways, including, changing the order of steps, which steps are performed on-line and which steps are performed off-line and/or the distribution of software which performs certain actions. In addition, various distribution and/or centralized configurations may be used to implement the above invention, preferably utilizing a variety of software tools. In addition, a multiplicity of various features, both of methods and of devices, have been described. It should be appreciated that different features may be combined in different ways. In particular, not all the features shown above in a particular embodiment are necessary in every similar preferred embodiment of the invention. Further, combinations of the above features are also considered to be within the scope of some preferred embodiments of the invention. Also within the scope of the invention are computer readable media on which software, for performing part or all of a preferred embodiment of the invention, are written. It should also be appreciated that many of the embodiments are described only as methods or only as apparatus. The scope of the invention also covers hardware and/or software adapted and/or designed and/or programmed to carry out the method type embodiments. In addition, the scope of the invention includes methods of using, constructing, calibrating and/or maintaining the apparatus described herein. When used in the following claims, the terms "comprises", "comprising", "includes", "including" or the like mean "including by not limited to".

What is claimed is:

1. A method of data transmission comprising:
    receiving a request for data over an Internet, by a data provider;
    obtaining data, in response to said request, at said data provider;
    performing a quality assurance procedure on said obtained data, responsive to said request, at said provider, wherein said performing a quality assurance procedure comprises comparing said data to said request; and
    transmitting said data over said Internet responsive to said assurance procedure.

2. A method according to claim 1, wherein assuring a quality comprises assuring that said data is pre-approved for transmission.

3. A method according to claim 2, wherein said assuring comprises verifying a digital signature of said data.

4. A method according to claim 3, wherein said verifying comprises applying a public-key decryption to said digital signature.

5. A method according to claim 3, wherein said verifying comprises applying a secret-key decryption to said digital signature.

6. A method according to claim 1, wherein said performing a quality assurance procedure comprises comparing said data to stored data.

7. A method according to claim 1, wherein said performing a quality assurance procedure comprises checking secure information associated with said data.

8. A method according to claim 1, wherein said performing a quality assurance procedure comprises checking a limited usage-code associated with said data.

9. A method according to claim 8, wherein said limited usage code comprises a time-limited code.

10. A method according to claim 9, wherein said limited usage code comprises a usage number-limited code.

11. A method according to claim 1, wherein said performing a quality assurance procedure comprises checking a one-way hash function of said data.

12. A method according to claim 11, wherein said one-way hash function comprises a checksum function.

13. A method according to claim 1, wherein said performing a quality assurance procedure comprises analyzing a content of said data.

14. A method according to claim 1, wherein transmitting said data responsive to said assurance procedure comprises not transmitting said data if said quality is not assured.

15. A method according to claim 1, wherein said transmitting said data comprises transmitting said data if said data does not require quality assurance.

16. A method according to claim 1, comprising generating an alert if said quality assurance fails.

17. A method according to claim 16, wherein said alert comprise a log-file entry.

18. A method according to claim 16, wherein said alert comprise a real-time alert to a human operator.

19. A method according to claim 1, comprising redressing said data if said quality assurance fails.

20. A method according to claim 19, wherein said redressing comprises replacing said data with verified data.

21. A method according to claim 20, wherein said verified data is a copy of the data which was to be obtained by said data provider.

22. A method according to claim 20, wherein said verified data is a not up-to-date copy of the data which was to be obtained by said data provider.

23. A method according to claim 19, wherein said data is part of a data transmission set and wherein redressing comprises modifying said data transmission set.

24. A method according to claim 1, wherein said data provider comprises an Internet server.

25. A method according to claim 24, wherein said data provider comprises a WWW server.

26. A method according to claim 24, wherein said data provider comprises an FTP server.

27. A method according to claim 24, wherein said data provider comprises a mail server.

28. A method according to claim 1, wherein said data provider comprises an Intranet server.

29. A method according to claim 1, comprising:
receiving said data by a user of said data; and
second performing a quality assurance procedure on said data, at said user.

30. A method according to claim 29, wherein said second performing a quality assurance procedure comprises checking a digital signature of said data.

31. A method according to claim 29, comprising generating said request by said user.

32. A method according to claim 1, comprising checking said obtained data for disallowed content, responsive to said request, at said provider.

33. A method according to claim 32, wherein said disallowed content comprises a human readable language.

34. A method according to claim 33, wherein said content comprises obscene language.

35. A method of data transmission comprising:
receiving a request for data over an Internet, by a data provider;
obtaining data, in response to said request, at said data provider;
performing a quality assurance procedure on said obtained data, responsive to said request, at said provider, wherein said performing a quality assurance procedure comprises comparing said data to stored data,
transmitting said data over said Internet responsive to said assurance procedure, and wherein said performing a quality assurance procedure comprises comparing said data to said request.

* * * * *